US009730375B2

(12) United States Patent
De Coninck

(10) Patent No.: US 9,730,375 B2
(45) Date of Patent: Aug. 15, 2017

(54) AGRICULTURAL HARVESTER

(71) Applicant: CNH Industrial America LLC, New Holland, PA (US)

(72) Inventor: Willem De Coninck, Ninove (BE)

(73) Assignee: CNH Industrial America LLC, New Holland, PA (US)

( * ) Notice: Subject to any disclaimer, the term of this patent is extended or adjusted under 35 U.S.C. 154(b) by 75 days.

(21) Appl. No.: 14/946,051

(22) Filed: Nov. 19, 2015

(65) Prior Publication Data

US 2016/0150716 A1 Jun. 2, 2016

(30) Foreign Application Priority Data

Nov. 27, 2014 (BE) .................... 2014/0825

(51) Int. Cl.
*A01B 63/10* (2006.01)
*A01B 63/08* (2006.01)
*A01D 41/06* (2006.01)
*A01B 63/00* (2006.01)
*A01D 41/16* (2006.01)
*A01D 41/14* (2006.01)

(52) U.S. Cl.
CPC .......... *A01B 63/008* (2013.01); *A01D 41/145* (2013.01); *A01D 41/16* (2013.01)

(58) Field of Classification Search
CPC ..... A01B 63/00; A01B 63/008; A01B 61/064; A01B 63/10; A01D 41/14; A01D 47/00; A01D 41/145; A01D 34/28
USPC ........................ 56/14.5, 14.6, 15.8
See application file for complete search history.

(56) References Cited

U.S. PATENT DOCUMENTS

| 4,313,294 | A | * | 2/1982 | Martenas | ............ | A01D 41/145 |
| | | | | | | 56/15.8 |
| 4,707,972 | A | * | 11/1987 | Knepper | ................ | A01D 41/14 |
| | | | | | | 460/16 |
| 6,116,008 | A | | 9/2000 | Digman et al. | | |
| 6,510,680 | B2 | | 1/2003 | Uhlending et al. | | |
| 6,826,894 | B2 | | 12/2004 | Thiemann et al. | | |
| 7,191,582 | B2 | | 3/2007 | Bomleny | | |
| 8,079,204 | B2 | | 12/2011 | Coers et al. | | |

(Continued)

FOREIGN PATENT DOCUMENTS

| DE | 4223026 A1 | 1/1994 |
| DE | 4324766 A1 | 1/1995 |

(Continued)

*Primary Examiner* — John G Weiss
(74) *Attorney, Agent, or Firm* — Patrick M. Sheldrake

(57) ABSTRACT

An agricultural harvester includes a harvester body, a header which is adapted for harvesting a crop, a feeder house which is adapted to receive said harvested crop from the header, a header adapter which is arranged between the header and the feeder house, which header adapter is adapted to allow the header to pivot relative to the feeder house about a horizontal pivot axis substantially parallel to the longitudinal axis of the header. A first actuator has a first end that is pivotably connected to the feeder house and a second end that is pivotably connected to the header adapter. A second actuator has a first end and a second end, which first end is pivotably connected to the harvester body. A coupling device is pivotably connected to the second end of the second actuator, the feeder house and the header adapter.

8 Claims, 2 Drawing Sheets

(56) References Cited

U.S. PATENT DOCUMENTS

| | | |
|---|---|---|
| 8,826,635 B2 | 9/2014 | Schraeder |
| 2001/0002533 A1 | 6/2001 | Rhody et al. |
| 2007/0294990 A1 | 12/2007 | Coers et al. |
| 2013/0283745 A1 | 10/2013 | Brendon et al. |
| 2013/0298515 A1 | 11/2013 | Lohrentz et al. |

FOREIGN PATENT DOCUMENTS

| | | | |
|---|---|---|---|
| FR | 2738987 A1 | 3/1997 | |
| GB | 2169785 A | 7/1986 | |

\* cited by examiner

AGRICULTURAL HARVESTER

This application claims priority to Belgium Application BE2014/0825 filed Nov. 27, 2014, which is incorporated herein by reference in its entirety.

FIELD OF THE INVENTION

The invention pertains to an agricultural harvester comprising a header and a feeder house, in which the header is pivotable relative to the feeder house. The agricultural harvester can for example be a combine harvester.

BACKGROUND OF THE INVENTION

The header is the part of the agricultural harvester that comprises a harvester device which harvests a crop from the field on which said crop has grown. The harvester device in the header can for example be adapted to cut off grain plants, oils seed plants or corn, or it can for example be adapted to remove corn ears from corn stalks. The thus harvested crop is then transported by a header conveyor through the header to a header discharge. The header discharge is generally arranged centrally in the rear part of the header. For the transport of the crop through the header, a header auger is a common solution.

From the header discharge, the harvested crop enters the feeder house. The feeder house transports the harvested crop into the body of the agricultural harvester, where the crop can be processed, e.g. threshed. The feeder house can be pivotable relative to the body of the agricultural harvester.

It can be desirable that the header is pivotable relative to the feeder house. The header may be pivotable about a generally horizontal axis that extends substantially perpendicular to the longitudinal direction of the header, in order to follow the slope of the terrain. Instead or in addition, the header may also be pivotable about a generally horizontal axis that extends substantially parallel to the longitudinal direction of the header. This allows to obtain a desired cutting angle or pick up angle, even when it is desired to keep the same height for the front end of the feeder house. The cutting angle or pick up angle may for example have to be adjusted when switching to a different kind of crop, a crop with different properties or when the overall height of the body of the agricultural harvester is changed, e.g. due to the exchange of tires or a change in the tire pressure.

In order to allow movement and/or adjustment of the header and the feeder house relative to each other, a header adapter is provided between the feeder house and the header.

The header adapter in known agricultural harvesters is actuated by one or more actuators, which usually take the form of hydraulic cylinders.

In a known configuration, the header adapter is fixed to the header and pivotable relative to the feeder house via an adapter pivot that allows the header to pivot about a generally horizontal pivot axis that extends in a direction substantially parallel to the longitudinal direction of the header. The adapter pivot is usually arranged at or near the top of the feeder house adjacent to the header, at or near the bottom of the feeder house adjacent to the header or about halfway the top and the bottom of the feeder house adjacent to the header.

At least one hydraulic cylinder is in this known configuration arranged adjacent to the header on the feeder house for pivoting the header relative to the feeder house about a horizontal pivot axis which extends substantially parallel to the longitudinal axis of the header. Each cylinder that is used for pivoting the header relative to the feeder house about a horizontal pivot axis which extends substantially parallel to the longitudinal axis of the header is on one end attached to the feeder house and on the other end to the header adapter.

Additionally in such an arrangement, at least one cylinder is provided to pivot the feeder house relative to the body of the agricultural harvester. Each cylinder that is used for pivoting the feeder house relative to the harvester body is on one end attached to the harvester body and on the other end to the feeder house.

In these known arrangements, the adapter pivot has to be strong, because it supports the full weight of the header. Also, the cylinder or cylinders that are used to pivot the header relative to the feeder house have to be quite strong, or otherwise multiple cylinders have to be used, which increases the costs. Because the header is arranged in front of the adapter pivot and the header is heavy, the weight of the header causes a tilting moment that needs to be counteracted by the cylinder of cylinders in order to keep the header in the correct position. This requires one or more strong cylinders.

U.S. Pat. No. 8,826,635 describes an agricultural harvester that comprises a header adapter which is fixed to the header and pivotable relative to the feeder house through an adapter pivot. The adapter pivot is located about halfway the top and the bottom of the feeder house adjacent to the header. A first cylinder is provided, which on one end is connected to the feeder house and on the other end to the header adapter. In addition a second cylinder is provided. This cylinder is on one end connected to the harvester body and on the other end to the header adapter.

The second cylinder is used to pivot the feeder house and the header together relative to the harvester body. Due to this, all force required for lifting the heavy header and feeder house has to be borne by the adapter pivot. So, also in this known arrangement, the adapter pivot has to be strong. This makes the header adapter heavy.

SUMMARY OF THE INVENTION

It is the object of the invention to provide an agricultural harvester with an improved configuration for pivoting the header relative to the feeder house.

This object is achieved with an agricultural harvester that comprises:
a harvester body,
a header, which is adapted for harvesting a crop from the field on which said crop was grown,
a feeder house which is adapted to receive said harvested crop from the header,
a header adapter which is arranged between the header and the feeder house and is connected to the header and to the feeder house, which header adapter is adapted to allow the header to pivot relative to the feeder house about a horizontal pivot axis which extends substantially parallel to the longitudinal axis of the header,
a first actuator, which has a first end which is pivotably connected to the feeder house and a second end which is pivotably connected to the header adapter,
a second actuator, which has a first end and a second end, which first end is pivotably connected to the harvester body,
a coupling device which is pivotably connected to the second end of the second actuator, the feeder house and the header adapter.

In the agricultural harvester according to the invention, the coupling device makes that the second actuator is connected to both the feeder house and the header adapter. Due to this arrangement, the second actuator directly bears at least a part of the weight of the header. Compared to known agricultural harvesters, in which the entire load caused by the weight of the header has to be supported by the connection between the header adapter and the feeder house, the current invention allows a lighter construction of the header adapter.

The second actuator may be used to pivot the feeder house relative to the harvester body, but it can also assist in pivoting the header relative to the feeder house. The first actuator is adapted to pivot the header relative to the feeder house. The first actuator pivots the header adapter relative to the feeder house, and the header is fixed to the header adapter. The second actuator optionally assists the first actuator with this pivoting.

In a possible embodiment, the agricultural harvester is a combine harvester.

In a possible embodiment, the header adapter is pivotably connected to the feeder house via an adapter pivot. This adapter pivot is adapted to allow pivoting of the header relative to the feeder house about a horizontal pivot axis which extends substantially parallel to the longitudinal axis of the header. Optionally, in this embodiment, the header is fixedly connected to the header adapter.

In this embodiment, using a coupling device in accordance with the invention makes that, unlike in many known agricultural harvesters, the adapter pivot is not the only connection between the feeder house and the header adapter that carries the weight of the header and the header adapter and has to withstand the moment due to the weight of the header and the header adapter, and partially of the feeder house. Therefore, the adapter pivot can be of a lighter construction.

In some known agricultural harvesters, the second actuator is connected to the header adapter instead of to the feeder house. In such an arrangement, the force that is required to keep the feeder house in the right position relative to the harvester body is transmitted through the adapter pivot, which makes that the adapter pivot has to be of a strong construction. In the embodiment according to the invention, the adapter pivot does not have to be so strong because the second actuator is coupled to the header adapter and to the feeder house via the coupling device.

In a variant of this embodiment, the connection between the second end of the first actuator and the header adapter is arranged on a first side of a horizontal plane through the horizontal pivot axis of the adapter pivot and the connection between the coupling device and the header adapter is arranged on a second side of a horizontal plane through the adapter pivot. The second side is opposite to the first side.

In this variant, the second actuator can contribute to the pivoting of the header. As in this arrangement, both the first and second actuator contribute to the pivoting of the header relative to the feeder house, the first cylinder does not have to be so strong as in known arrangement in which only the first actuator is used to pivot the header relative to the feeder house. Furthermore, as the first actuator and, via the coupling device, the second actuator engage the header adapter on opposite sides of the adapter pivot, the mechanical load on the adapter pivot that is caused by the pivoting action of the first and second actuator is relatively small. This also allows a lighter construction of the adapter pivot.

Optionally, in this variant, the distance between the adapter pivot and the connection between the second end of the first actuator and the header adapter is substantially equal to the distance between the adapter pivot and the connection between the coupling device and the header adapter.

In a possible embodiment, the distance between the connection between the first end of the first actuator and the header adapter on the one hand and the connection between the coupling device and the header adapter on the other hand is at least 75% of the height of the adapter. This reduces the force that the first and second actuator have to produce for pivoting the header relative to the feeder house.

In a possible embodiment, the coupling device is a coupling mechanism, which coupling mechanism comprises at least two links that are pivotable relative to each other. The coupling mechanism allows to transmit force between the header adapter and the feeder house while still allowing relative movement of the connection between the feeder house and the coupling device and the connection between the header adapter and the coupling device. The coupling mechanism furthermore allows to prescribe the desired relative movement between those two connections. Furthermore, the coupling mechanism can be designed to optimize the force distribution between the header adapter and the feeder house.

In a variant of this embodiment, each link comprises at least two pivots, and each pivot pivotably connects said link to one of the second end of the second actuator, the feeder house, the header adapter or another link of the coupling mechanism. Optionally, in at least one link of the coupling mechanism, the distance between at least two pivots of said link is adjustable. This adjustment allows to further control the relative movement of the header adapter and the feeder house.

The adjustment of the distance between at least two pivots of a link can be achieved in various ways. For example, at least one of the links may be a length-adjustable link. The length-adjustable link may be or comprise a length adjustment device. The length adjustment device may for example be or comprise a hydraulic cylinder or a spindle-and-nut arrangement. Alternatively or in addition, the length-adjustable link may comprise at least two link segments, wherein the relative angle between these link segments can be adjusted and then fixed. In any of these embodiments, the length-adjustable link may be designed such that the length adjustment can be made during operation of the agricultural harvester (e.g. by a central control unit that controls the length of the length-adjustable link) or only when the agricultural harvester is idle.

In a possible embodiment, the coupling device is pivotably connected to the second end of the second actuator via an first coupling pivot, and pivotably connected to the feeder house via a second coupling pivot, and pivotably connected to the header adapter via a third coupling pivot.

In a possible embodiment in which the header adapter is pivotably connected to the feeder house via an adapter pivot, and the adapter pivot is adapted to allow pivoting of the header relative to the feeder house about a horizontal pivot axis which extends substantially parallel to the longitudinal axis of the header, the header comprises a harvester device for harvesting a crop from the field on which it was grown and a header conveyor for receiving the harvested crop from the harvester device and transporting said crop to a header discharge. Furthermore, in this embodiment, the feeder house comprises a feeder house conveyor which is arranged to receive harvested crop from the header discharge. The header conveyor comprises a header auger and the feeder house conveyor comprises a cylindrical drum which is arranged adjacent to the header discharge. The cylindrical drum is preferably arranged in the feeder house adjacent to the header auger, so the harvested crop can be transferred efficiently from the header auger to the feeder house conveyor. Over the cylindrical drum, optionally at least one belt or chain may be arranged.

In this embodiment, the adapter pivot is arranged in a plane that extends through the longitudinal center line of the header auger and through the longitudinal center line of the cylindrical drum of the feeder house conveyor.

In this embodiment, the distance between the header auger and the feeder house conveyor does not change when the header is pivoted relative to the feeder house. This way, a proper transfer of the harvested crop from the header auger to the feeder house conveyor is ensured regardless of the angle between the header and the feeder house.

BRIEF DESCRIPTION OF THE DRAWINGS

The invention will be described in more detail below under reference to the figures, in which in a non-limiting manner exemplary embodiments of the invention will be shown.

In the figures.

DETAILED DESCRIPTION OF PREFERRED EMBODIMENTS

Figure 1:
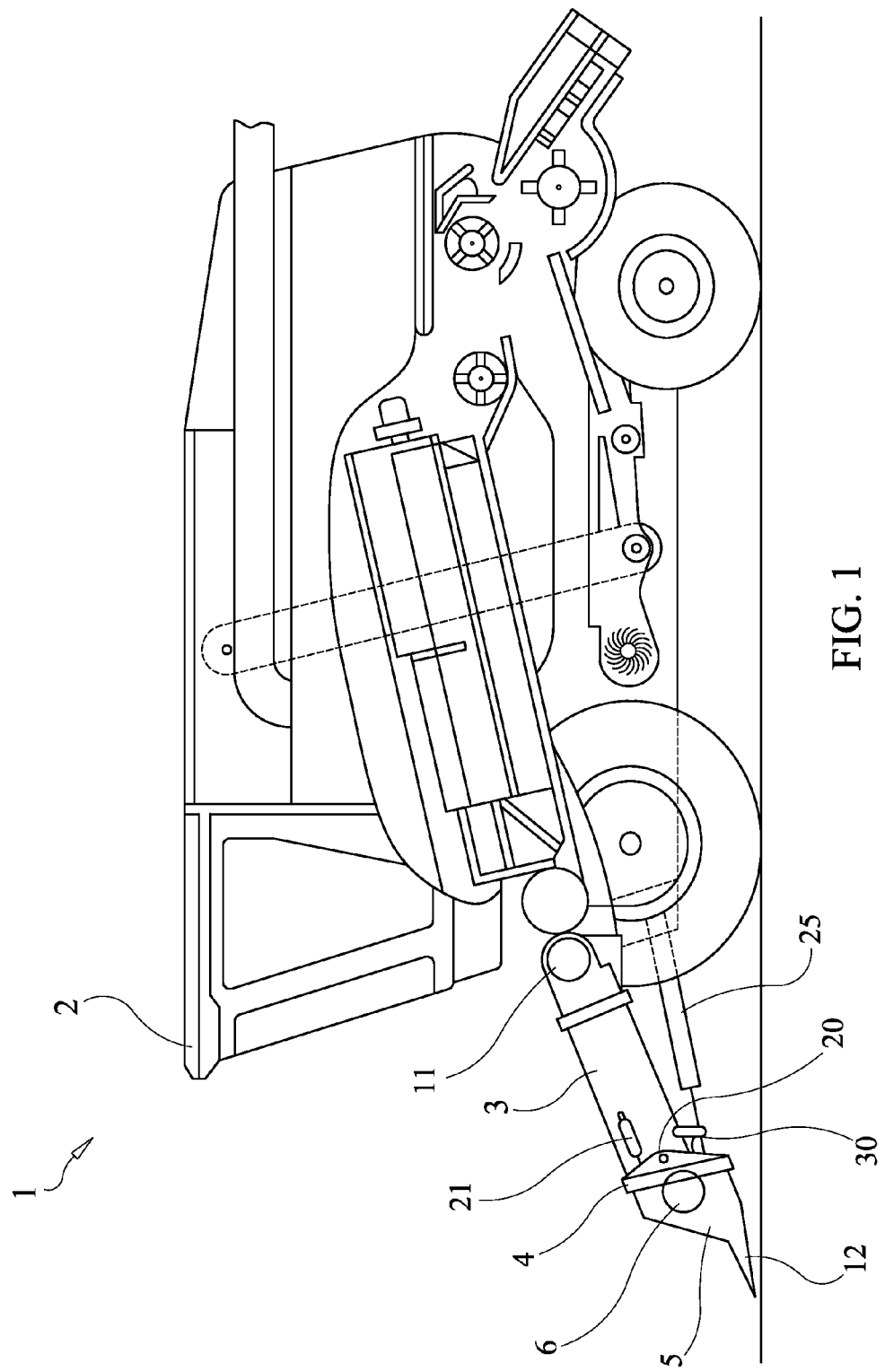
FIG. 1: illustrates an example of an agricultural harvester in accordance with the invention, as seen in side view.
Figure 2:
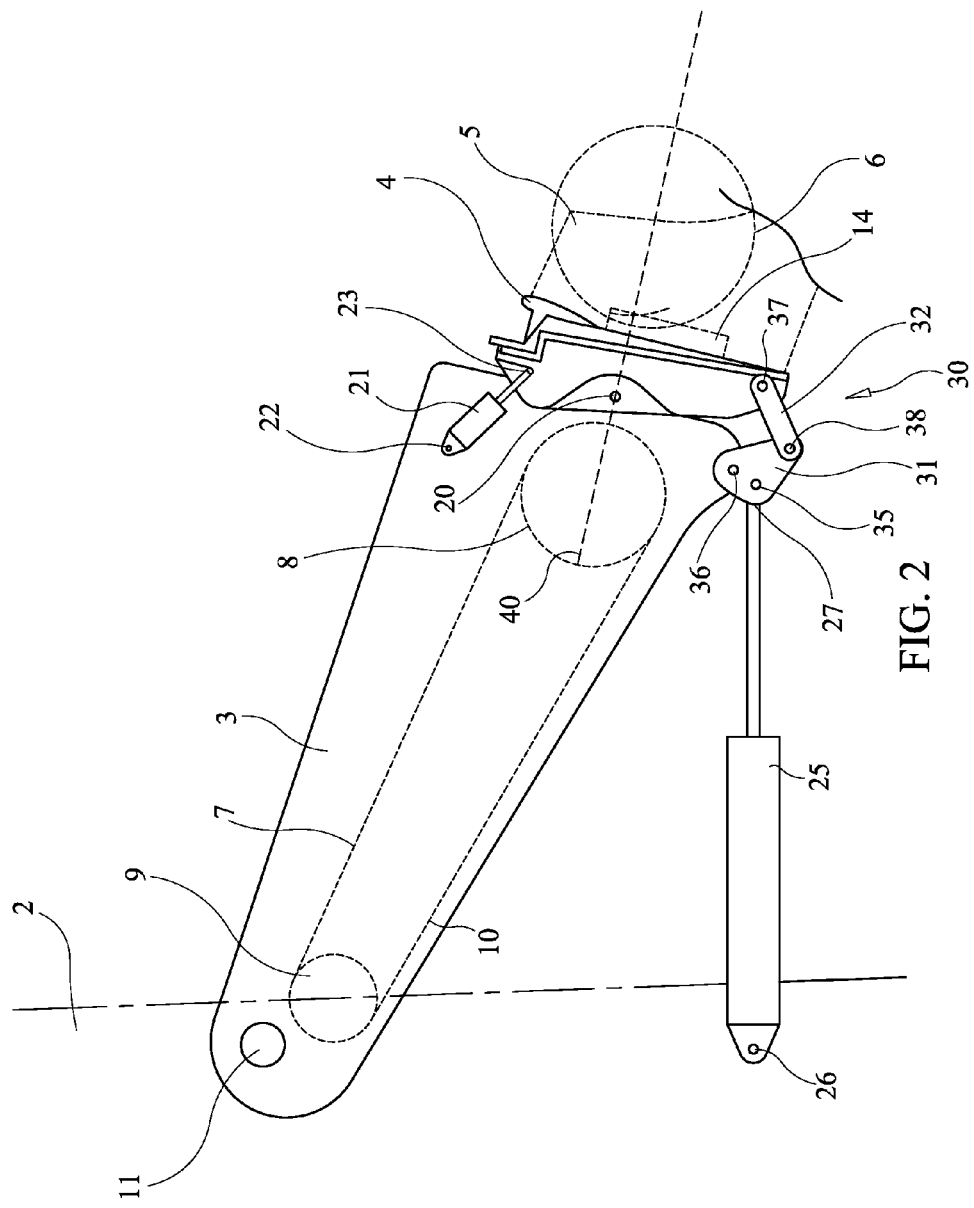
FIG. 2: illustrates the feeder house, header adapter and first and second actuator of the agricultural harvester according to the invention in more detail.

FIG. 1 illustrates an example of an agricultural harvester 1 in accordance with the invention, as seen in side view. FIG. 2 illustrates the feeder house, header adapter and first and second actuator of the agricultural harvester according to the invention in more detail.

The agricultural harvester of FIG. 1 comprises a harvester body 2, a header 5 and a feeder house 3. Between the header 5 and the feeder house 3, a header adapter 4 is arranged.

The header 5 is adapted for harvesting a crop from the field on which said crop was grown. The header 5 can for example be equipped a harvester device 12, e.g. comprising a mower or stalk puller. When the crop has been separated from the field, the now harvested crop is transported by a header conveyor from the harvester device to a header discharge 14. The header discharge 14 is where the harvested crop leaves the header. The header conveyor can for example be a header auger 6.

The feeder house 3 is adapted to receive the harvested crop from the header, e.g. from the header discharge to which the header auger 6 has transported the harvested crop. The feeder house 3 generally contains a feeder conveyor 7 (see FIG. 2) that transports the harvested crop further into the harvester body 2 of the agricultural harvester 1. The feeder house conveyor 7 for example comprises a header side cylindrical drum 8, a body side cylindrical drum 9 and one or more chains or belts 10. The header side cylindrical drum 8 is a cylindrical drum which is arranged in the feeder house adjacent to the header discharge.

The harvester body 2 of the agricultural harvester optionally contains at least one crop processing device, for example a thresher, a sieving device and/or a cutter device. The harvester body 2 optionally also comprises a grain tank in which the harvested crop is temporarily stored. The grain tank is emptied periodically.

Optionally, the feeder house 3 is pivotable relative to the harvester body 2 about pivot 11.

The header adapter 4 is arranged between the header 5 and the feeder house 3. It is connected to the header 5 and to the feeder house 3. The header adapter 4 is adapted to allow the header 5 to pivot relative to the feeder house 3. In the example of FIG. 1, the header adapter 4 is fixedly connected to the header 5 and pivotably connected to the feeder house 3. An adapter pivot 20 provides this pivotable connection of the header adapter 4 to the feeder house 3. The adapter pivot 20 is adapted to allow pivoting of the header 5 relative to the feeder house 3 about a horizontal pivot axis which extends substantially parallel to the longitudinal axis of the header 5. Optionally, two adapter pivot 20 are present: one on the left side of the feeder house 3 and one on the right side of the feeder house.

The agricultural harvester 1 further comprises a first actuator 21. The first actuator 21 which has a first end 22 which is pivotably connected to the feeder house 3 and a second end 23 which is pivotably connected to the header adapter 4.

The agricultural harvester 1 further comprises a second actuator 25, which has a first end 26 and a second end 27, which first end 26 is pivotably connected to the harvester body 2.

The second actuator 25 may be used to pivot the feeder house 3 relative to the harvester body 2, but it can also assist in pivoting the header 5 relative to the feeder house 3. The first actuator 21 is adapted to pivot the header 5 relative to the feeder house 3 by pivoting the header adapter 4 relative to the feeder house 3. The second actuator 25 optionally assists the first actuator 21 with this pivoting.

The agricultural harvester 1 further comprises a coupling device 30 which is pivotably connected to the second end 27 of the second actuator 25, the feeder house 3 and the header adapter 4.

In known agricultural harvesters, the adapter pivot 20 is the only weight bearing connection between the header adapter 4 and the feeder house 3. FIG. 2 clearly shows that in the agricultural harvester according to the invention, also the second actuator 25 bears part of the weight of the header adapter 4 and header 5—and if the feeder house 3 is pivotably connected to the harvester body 2, also part of the weight of the feeder house—via the coupling device 30. This has the advantage that the adapter pivot 20 can be of lighter construction.

In the embodiment shown in the figures, the adapter pivot 20 is arranged in a plane 40 that extends through the longitudinal center line of the header auger 6 and through the longitudinal center line of the cylindrical drum 8 of the feeder house conveyor 7, which cylindrical drum 8 is arranged in the feeder house 3 adjacent to the header discharge 14. In this arrangement, when the header 5 is pivoted relative to the feeder house 3, the distance between the header auger 6 and the header side cylindrical drum 8 remains the same, so that an efficient transfer of harvested crop from the header 5 to the feeder house 3 remains ensured.

As can be seen in FIG. 2, in the embodiment that is shown the connection between the second end 23 of the first actuator 21 and the header adapter 4 is arranged on a first side of a horizontal plane through the horizontal pivot axis of the adapter pivot 20 and the connection between the coupling device 30 and the header adapter 4 is arranged on a second side of a horizontal plane through the adapter pivot 20, which second side is opposite to the first side. In the embodiment shown in FIG. 2, the connection between the second end 23 of the first actuator 21 and the header adapter 4 is arranged above the adapter pivot 20, and the connection between the coupling device 30 and the header adapter 4 is arranged below the adapter pivot 20.

As can be seen in FIG. 2, in this embodiment the connection between the second end 23 of the first actuator 21 and the header adapter 4 is arranged near the top of the header adapter 4. The connection between the coupling device 30 and the header adapter 4 is arranged near the bottom of the header adapter 4. This way, the arm of the pivot moment that is exerted by the first actuator 21 and the second actuator 25 is rather large. This way, the force that has to be delivered by the actuators to effect the pivoting of the header adapter 4 and the header 5 relative to the feeder house 3 can be kept relatively small. This way, rather light actuators can be used. Preferably, the distance between the connection between the second end 23 of the first actuator 21 and the header adapter 4 on the one hand and the connection between the coupling device 30 and the header adapter 4 on the other hand is at least 75% of the height of the header adapter 4.

In the embodiment shown in FIG. 2, the coupling device 30 is a coupling mechanism. The coupling mechanism comprises at least two links 31, 32 that are pivotable relative to each other. The mechanism allows to prescribe a desired path of relative movement of the feeder house 3 and the header adapter 4.

In the embodiment shown in FIG. 2, the coupling device 30 is pivotably connected to the second end 27 of the second actuator 25 via a first coupling pivot 35. The coupling device 30 is pivotably connected to the feeder house 3 via a second coupling pivot 36. The coupling device 30 is pivotably connected to the header adapter 4 via a third coupling pivot 37. In the embodiment that is shown, in addition a coupling mechanism pivot 38 is present within the coupling device 30.

In the embodiment of FIG. 2, the first link 31 is a lever which has three pivots: the first coupling pivot 35, the second coupling pivot 36 and a coupling mechanism pivot 38 that pivotably connects the first link with the second link 32.

In the embodiment of FIG. 2, the links have fixed distances between the pivot points. In a different embodiment however, at least one of the links could have an adjustable distance between at least two of the pivots.

The invention claimed is:
1. Agricultural harvester, comprising:
a harvester body,
a header, which is adapted for harvesting a crop from a field,
a feeder house adapted to receive said harvested crop from the header,
a header adapter arranged between the header and the feeder house and is connected to the header and to the feeder house, the header adapter adapted to allow the header to pivot relative to the feeder house about a horizontal pivot axis which extends substantially parallel to the longitudinal axis of the header,
a first actuator, which has a first end which is pivotably connected to the feeder house and a second end which is pivotably connected to the header adapter,
a second actuator, which has a first end and a second end, which first end is pivotably connected to the harvester body,
a coupler pivotably connected to the second end of the second actuator, the feeder house and the header adapter.
2. Agricultural harvester according to claim 1, wherein the header adapter is pivotably connected to the feeder house via a adapter pivot, which adapter pivot is adapted to allow pivoting of the header relative to the feeder house about a horizontal pivot axis which extends substantially parallel to the longitudinal axis of the header.
3. Agricultural harvester according to claim 2, wherein the connection between the second end of the first actuator and the header adapter is arranged on a first side of a horizontal plane through the horizontal pivot axis of the adapter pivot and the connection between the coupler and the header adapter is arranged on a second side of a horizontal plane through the adapter pivot, which second side is opposite to the first side.
4. Agricultural harvester according to claim 1, wherein a distance between the connection between the second end of the first actuator and the header adapter and the connection between the coupler and the header adapter is at least 75% of the height of the header adapter.
5. Agricultural harvester according to claim 1, wherein the coupler is a coupling mechanism comprising at least two links that are pivotable relative to each other.
6. Agricultural harvester according to claim 5, wherein each link comprises at least two pivots, wherein each pivot pivotably connects said link to one of the second end of the second actuator, the feeder house, the header adapter or another link of the coupling mechanism, and wherein in at least one link of the coupling mechanism, the distance between at least two pivots of said link is adjustable.
7. Agricultural harvester according to claim 1, wherein the coupler is pivotably connected to the second end of the second actuator via a first coupling pivot, and pivotably connected to the feeder house via a second coupling pivot, and pivotably connected to the header adapter via a third coupling pivot.
8. Agricultural harvester according to claim 2, wherein the header comprises a header conveyor for receiving the harvested and transporting said crop to a header discharge, and wherein the feeder house comprises a feeder house conveyor arranged to receive harvested crop from the header discharge, wherein the header conveyor comprises a header auger and the feeder house conveyor comprises a cylindrical drum which is arranged adjacent to the header discharge, and wherein the adapter pivot is arranged in a plane that extends through the longitudinal center line of the header auger and through the longitudinal center line of the cylindrical drum of the feeder house conveyor.

\* \* \* \* \*